US009779887B2

(12) United States Patent
Pyzza et al.

(10) Patent No.: US 9,779,887 B2
(45) Date of Patent: Oct. 3, 2017

(54) APPARATUS FOR ENCLOSING ENERGY STORAGE DEVICES

(71) Applicant: Ioxus, Inc., Oneonta, NY (US)

(72) Inventors: Jake Pyzza, Troy, NY (US); Daniel Matthew Halbig, Ballson Lake, NY (US)

(73) Assignee: Ioxus, Inc., Oneonta, NY (US)

( * ) Notice: Subject to any disclaimer, the term of this patent is extended or adjusted under 35 U.S.C. 154(b) by 210 days.

(21) Appl. No.: 14/597,844

(22) Filed: Jan. 15, 2015

(65) Prior Publication Data

US 2016/0211086 A1    Jul. 21, 2016

(51) Int. Cl.
*H05K 7/20* (2006.01)
*H01G 11/82* (2013.01)
*H01G 9/00* (2006.01)
*H01G 9/08* (2006.01)
*H01G 9/21* (2006.01)
*H01G 11/08* (2013.01)
*H01G 11/10* (2013.01)
*H01G 11/76* (2013.01)
*H01M 2/10* (2006.01)
*H01M 10/653* (2014.01)

(52) U.S. Cl.
CPC ........... *H01G 11/82* (2013.01); *H01G 9/0003* (2013.01); *H01G 9/08* (2013.01); *H01G 9/21* (2013.01); *H01G 11/08* (2013.01); *H01G 11/10* (2013.01); *H01G 11/76* (2013.01); *H01M 2/1016* (2013.01); *H01M 10/653* (2015.04); *Y02E 60/13* (2013.01)

(58) Field of Classification Search
CPC ...... H01G 11/08; H01G 11/82; H01G 9/0003; H01G 9/08; H01G 9/21
See application file for complete search history.

(56) References Cited

U.S. PATENT DOCUMENTS

| 5,070,427 A | 12/1991 | Bush |
| 5,510,208 A | 4/1996 | Hall et al. |
| 6,087,038 A * | 7/2000 | Flament .............. H01M 2/1072 429/120 |
| 6,811,921 B2 | 11/2004 | Dansui et al. |
| 7,180,726 B2 | 2/2007 | Thrap |
| 7,531,269 B2 | 5/2009 | Wegner |

(Continued)

FOREIGN PATENT DOCUMENTS

WO    2012043266 A1    4/2012

OTHER PUBLICATIONS

Patent Cooperation Treaty, International Search Report for PCT/US2016/013336 dated Mar. 17, 2016, 9 pages.

*Primary Examiner* — Yuriy Semenenko
(74) *Attorney, Agent, or Firm* — Matthew J. Kinnier; Hoffman Warnick LLC

(57) ABSTRACT

Embodiments of the present disclosure include an apparatus for enclosing energy storage devices. An apparatus according to the present disclosure can include: an elongated sleeve having a contoured interior configured to enclose each of a plurality of energy storage devices, wherein the elongated sleeve is composed at least partially of a thermally conductive material; and at least one slot disposed on an exterior surface of the elongated sleeve, wherein the at least one slot is configured to receive for mechanically coupling a mounting rail to the elongated sleeve.

20 Claims, 5 Drawing Sheets

(56) References Cited

U.S. PATENT DOCUMENTS

| | | |
|---|---|---|
| 7,776,467 B2 | 8/2010 | Kato et al. |
| 8,114,540 B2 | 2/2012 | Trester et al. |
| 8,178,234 B2 | 5/2012 | Fukuoka et al. |
| 2003/0059676 A1* | 3/2003 | Ruiz Rodriguez .. H01M 2/0242 429/164 |
| 2005/0079408 A1 | 4/2005 | Hirano |
| 2005/0255379 A1 | 11/2005 | Marchio et al. |
| 2006/0078789 A1* | 4/2006 | Wegner ............... H01M 10/625 429/120 |
| 2007/0099073 A1 | 5/2007 | White et al. |
| 2008/0318119 A1 | 12/2008 | Watanabe et al. |
| 2009/0080126 A1 | 3/2009 | Wilk et al. |
| 2009/0111015 A1* | 4/2009 | Wood ................. H01M 2/1077 429/164 |
| 2009/0155680 A1 | 6/2009 | Maguire et al. |
| 2010/0028764 A1 | 2/2010 | Maier et al. |
| 2010/0247994 A1* | 9/2010 | Park .................... H01M 2/105 429/96 |
| 2011/0177381 A1 | 7/2011 | Oya et al. |
| 2012/0115016 A1 | 5/2012 | Kim |
| 2013/0082520 A1 | 4/2013 | Leemans et al. |
| 2013/0266826 A1 | 10/2013 | Cowperthwaite et al. |
| 2013/0316203 A1* | 11/2013 | Hsiao ................ H01M 10/5004 429/83 |

\* cited by examiner

APPARATUS FOR ENCLOSING ENERGY STORAGE DEVICES

BACKGROUND OF THE INVENTION

This disclosure relates generally to apparatuses for enclosing energy storage devices, and more particularly, to apparatuses which can include an elongated sleeve with slots for mechanically coupling one or more mounting rails to the elongated sleeve.

In conventional capacitor assemblies, a plurality of capacitor cells, ultracapacitor cells, batteries, or other energy storage devices may be loosely held together within a housing that can subject the cells to a certain amount of external forces, including vibratory forces. In some cases, these forces can exceed the strength of the securing components. The resulting vibratory action may reduce the durability and lifespan of the energy storage devices. In addition, the passage of electrical currents through particular materials, including ultracapacitors, may cause the materials therein to experience temperature increases. Apparatuses and methods for managing vibratory action, temperatures, and related variables is an ongoing design challenge in the field of energy storage products and components.

Some energy storage devices, including those with capacitor assemblies, may use adhesive substances and thermal inserts between capacitor cells. These components can dissipate heat generated during operation and reduce rotation and prevent any dislodging of the capacitor cells within the assembly. These components are typically positioned between connected or adjacent capacitors and may be located along or nearby the path of an electric current. To connect energy storage devices together, complex bonding mechanisms between numerous surfaces may be used. These design choices may reduce some performance aspects of the energy storage devices during operation, and can limit the opportunity for further modifications.

BRIEF DESCRIPTION OF THE INVENTION

A first aspect of the present disclosure provides an apparatus including: an elongated sleeve having a contoured interior configured to enclose each of a plurality of energy storage devices, wherein the elongated sleeve is composed at least partially of a thermally conductive material; and at least one slot disposed on an exterior surface of the elongated sleeve, wherein the at least one slot is configured to receive a coupling component for mechanically coupling a mounting rail to the elongated sleeve.

A second aspect of the present disclosure provides an apparatus including: an elongated sleeve having a contoured interior configured to enclose and engage a curved surface of each of a plurality of energy storage devices, wherein the elongated sleeve is composed at least partially of a thermally conductive material; at least one slot disposed on an exterior surface of the elongated sleeve; a coupling component disposed within the at least one slot, wherein the coupling component is configured to receive a mounting rail, and the mounting rail conducts heat from the plurality of energy storage devices and mechanically couples an external structure to the elongated sleeve.

A third aspect of the invention provides an apparatus including: a plurality of axially aligned energy storage devices each having a curved exterior surface, immediately adjacent energy storage devices being connected together at a welded joint; an elongated sleeve having a length and a contoured interior, the contoured interior enclosing the plurality of energy storage devices and engaging the curved exterior surfaces of the plurality of energy storage devices, wherein the elongated sleeve is composed at least partially of a thermally conductive material; at least one slot disposed on an exterior surface of the elongated sleeve; a coupling component disposed within the at least one slot; and a mounting rail mechanically coupled to the coupling component, wherein the mounting rail conducts heat from the plurality of energy storage devices to an external structure mechanically coupled to the elongated sleeve through the mounting rail.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

Figure 1:
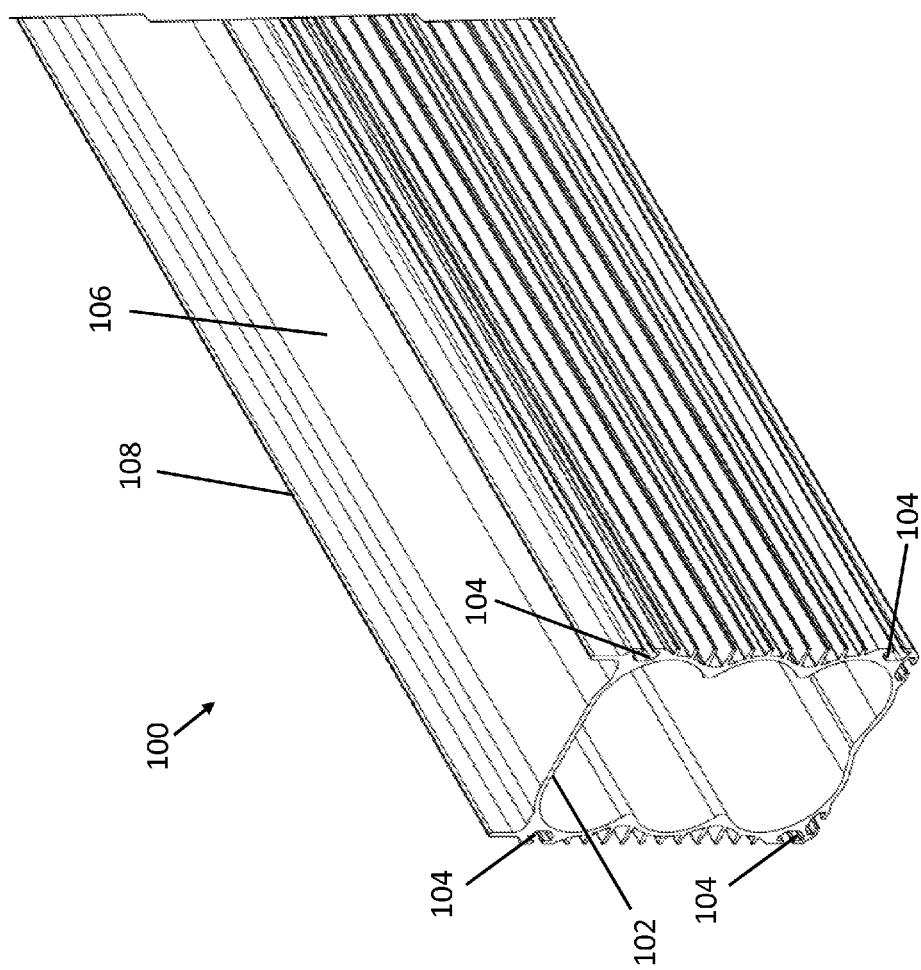
FIG. 1 shows a partial perspective view of an elongated sleeve according to embodiments of the present disclosure.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-5, like numbering may represent like elements. Redundant explanation of these elements has been omitted for clarity. Finally, it is understood that the components of FIGS. 1-5 and their accompanying descriptions may be applied to any embodiment described herein. The detailed description explains embodiments of the invention, together with advantages and features, by way of example with reference to the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Elements described as being "disposed" or "disposed on" another element can be separably or inseparably positioned thereon or therein, embedded within, continuous with, and/or integral to the element on which the particular element is said to be disposed. When an element or layer is referred to as being "on," "engaged to," "disengaged from," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," "inlet," "outlet," "top," "bottom," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates generally to an apparatus for enclosing and transferring heat from several energy storage devices. Generally, embodiments of the present disclosure can include an elongated sleeve with a contoured surface. The contoured surface of the elongated sleeve can enclose a plurality of energy storage devices. The elongated sleeve, itself, can be composed of a "thermally conductive material." A "thermally conductive material," as used herein, can include any currently known or later developed material capable of transferring heat throughout and within a structure, such as a metal (e.g., pure metals such as aluminum or alloys such as steel), a ceramic material (e.g., potting materials), a thermally conductive organic material (e.g., thermally conductive plastics and/or epoxies), combinations thereof (e.g., glass fibers or mineral-filled plastics), and/or any other material with a thermal conductivity greater than that of air. A thermally conductive material may also include composite structures made up of two or more of these materials. The elongated sleeve can feature at least one slot disposed on its exterior surface. The slot(s) can be configured to include and/or receive a coupling component. The coupling component can mechanically couple a mounting rail to the elongated sleeve. The mounting rail and coupling component can form a thermally conductive connection between the apparatus and external structures located in a particular environment. Heat can thus be transferred outside the structure of the elongated sleeve through the mounting rail.

Turning to FIG. 1, an elongated sleeve 100 according to embodiments of the present disclosure is shown. Elongated sleeve 100 can be shaped to enclose a particular cross-sectional area with a corresponding number of energy storage devices included within the cross section. In an example embodiment, elongated sleeve 100 can enclose a cross section sized for housing a particular number (e.g., four, six, eight, etc.) energy storage devices therein. Elongated sleeve 100 may be composed of a thermally conductive material. Elongated sleeve 100 can also be manufactured as an extrusion, initially with any conceivable length dimension, such that elongated sleeve 100 can be modified (e.g., cut, machined, modified, or otherwise reduced in size) to a desired length for including a predetermined number of energy storage devices for a particular application or deployment. Other features of elongated sleeve 100 discussed herein can similarly be manufactured to have any conceivable initial length, and then reduced in size to the desired length for a particular application.

A contoured interior 102 can be shaped for a particular apparatus or implementation, and can define the interior cross section of elongated sleeve 100, e.g., to engage similarly contoured exterior surfaces of energy storage devices housed therein. Elongated sleeve 100 can include one or more slots 104 thereon. As is discussed elsewhere herein, slots 104 can be configured to receive coupling components for mechanically coupling elongated sleeve 100 to other structures or components. An exterior surface 106 of elongated sleeve 100 may have a different type of profile and/or contour from contoured interior 102, and slots 104 may be disposed on exterior surface 106. In a particular embodiment, slots 104 may take the shape of an expanded chamber for removably retaining components, such as mechanical coupling components therein.

In an embodiment, slots 104 provided in the form of a chamber can include two intersecting cavities offset by a particular angle, such as a substantially perpendicular angle (e.g., by between approximately eighty degrees and approximately one hundred degrees), such that the two intersecting cavities at least partially form the shape of a "t" or "T." As used herein, the term "approximately" in relation to a specified numerical value (including percentages of base numerical values) can include all values within a substantially similar range, e.g., fifteen percentage points of above or below, the enumerated value or percentage. An approximate value can also include all other values which cause no operational difference or substantial operational difference between the approximate value and the enumerated value. The term approximately can also include other specific values or ranges where specified herein. In the example shown in FIGS. 1 and 3-5, slots 104 include an at least partially expanded or mushroom-shaped chamber or cavity for retaining coupling components therein with a cross-sectional area greater than a smaller-area or bottlenecked portion within slot 104. Slots 104 can be shaped, machined, modified, etc. into any desired shape corresponding to a particular mechanical coupling component in embodiments of the present disclosure, and as examples can include V-shaped slots, Y-shaped slots, substantially circular or substantially rectangular slots, slots with at least partially irregular contours and/or geometries, etc.

Slots 104 can be positioned on or within exterior surface 106 of elongated sleeve 100 at any desired location, and in a particular embodiment two slots 104 can be positioned on opposing sides of elongated sleeve 100. Slots 104 being positioned on opposing sides of elongated sleeve 100 can provide symmetry and structural support from components coupled to and/or positioned within slots 104. Elongated sleeve 100 can also include one or more thermally conductive fins 108 positioned on exterior surface 104. Thermally conductive fins 108 can be in the form of any protrusion, fixture, addition, component, etc., for increasing the surface area of elongated sleeve 100. Thermally conductive fins 108 can be composed of a thermally conductive material, e.g., the same material as elongated sleeve 100 or a different material. Slots 104 and/or thermally conductive fins 108 can be formed with elongated sleeve 100 as part of a single extrusion, and in embodiments may be integral to the structure of elongated sleeve 100. Furthermore, slots 104 and/or conductive fins 108 may run along all or substantially all of a length dimension of elongated sleeve 100, such that elongated sleeve 100 including slots 104 and/or conductive fins 108 can be manufactured in a larger size and cut, machined, shaped, and/or otherwise reduced in size to a reduced length usable for one or more particular applications. Where slots 104 extend across the length of elongated sleeve 100, slots 104 can include multiple mechanical coupling components therein, or other larger components capable of being affixed to or retained therein slots 104 with a particular length. In addition or alternatively, slots 104 extending across the length of elongated sleeve 100 can be configured to receive external coupling components to retain or matingly engage all or a portion of the length of elongated sleeve 100.

Figure 2:
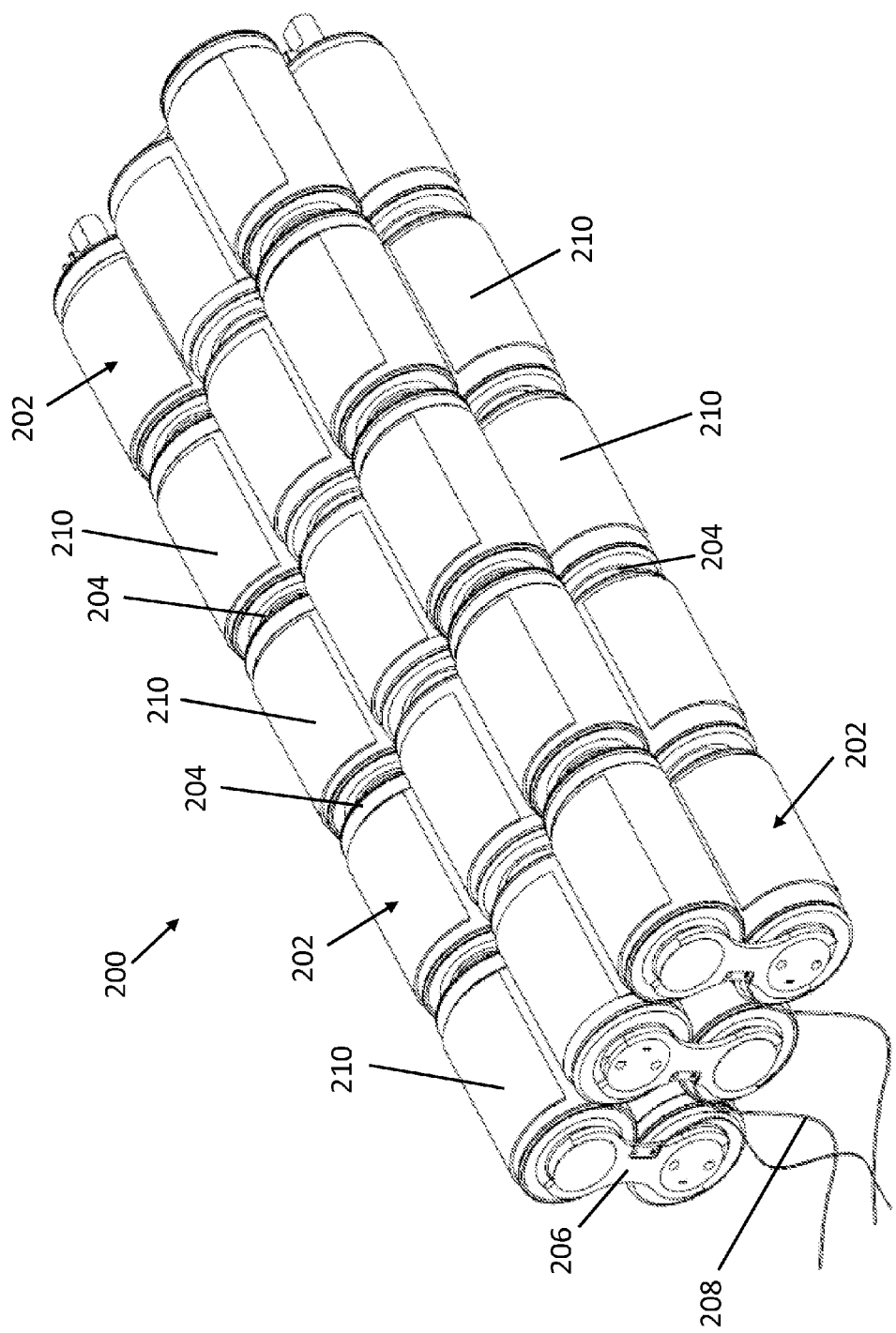
FIG. 2 shows a perspective view of a plurality of energy storage devices according to embodiments of the present disclosure.

Turning to FIG. 2, a plurality 200 of energy storage devices 202 according to embodiments of the present disclosure is shown. Several energy storage devices 202 in plurality 200 can be connected together in series. Energy storage devices 202 can be in the form of ultracapacitors or other devices for storing a particular electrical charge. Axially adjacent energy storage devices 202 can be connected end to end via welded joints 204. Welded joints 204 can be formed through a spot weld, a circumferential weld, a TIG (gas tungsten arc) weld, a MIG (gas metal arc) weld, an EB (electric beam) weld, a laser weld, or any other types of welding currently known or later developed. In an example embodiment, laser welding can be used to form welded joints 204 by welding two energy storage devices 202 together along a single circumferential line of each axially adjacent energy storage device cell 202.

Two sets of axially connected energy storage devices 202 can be electrically connected to each other by way of a bus bar 206 positioned between and contacting two axially terminal energy storage devices 202 of the two sets. Bus bar 206 can be composed of an electrically and thermally conductive material such as a metal, and in an embodiment may be composed of the same material as the electrically conductive components of energy storage devices 202 (e.g., copper, aluminum, silver, etc.). In addition, plurality 200 of energy storage devices 202 can be electrically connected to a load or other component by way of a wiring harness 208. One or more energy storage devices 202 can include a thermal insert 210 bonded thereto. Thermal insert 210 may be in the form of a thermally conducting, electrically insulative material to provide a form of thermal communication (e.g., a thermal conduit or heat sink) between plurality 200 of energy storage devices 202 and an external environment and/or other thermally conductive materials. Thermal insert 210 can have a material composition of a plastic material, a ceramic material, or any similar substance capable of insulating an electrical current while transmitting heat from energy devices 202 and adding structural support to plurality 200 of energy storage devices 202.

Energy storage devices 202 can contact contoured interior 102 (FIG. 1) of elongated sleeve 100 (FIG. 1) through thermal insert 210, which in turn can act as a bridge or transitional component. The configuration of thermal insert 210 optionally allows heat to be communicated from energy storage devices 202 without altering the connection between them, including weld bonds 204, such that one or more thermal inserts 210 can be added to or removed from energy storage devices 202 as desired. Embodiments of the disclosure can use any number of thermal inserts 210 with energy storage devices 202 to suit varying operational and/or heat distribution requirements. In an alternative embodiment, some or all thermal inserts 210 can be omitted and energy storage devices 202 can transfer heat to other components and/or structures by directly contacting those components and/or structures.

Figure 3:
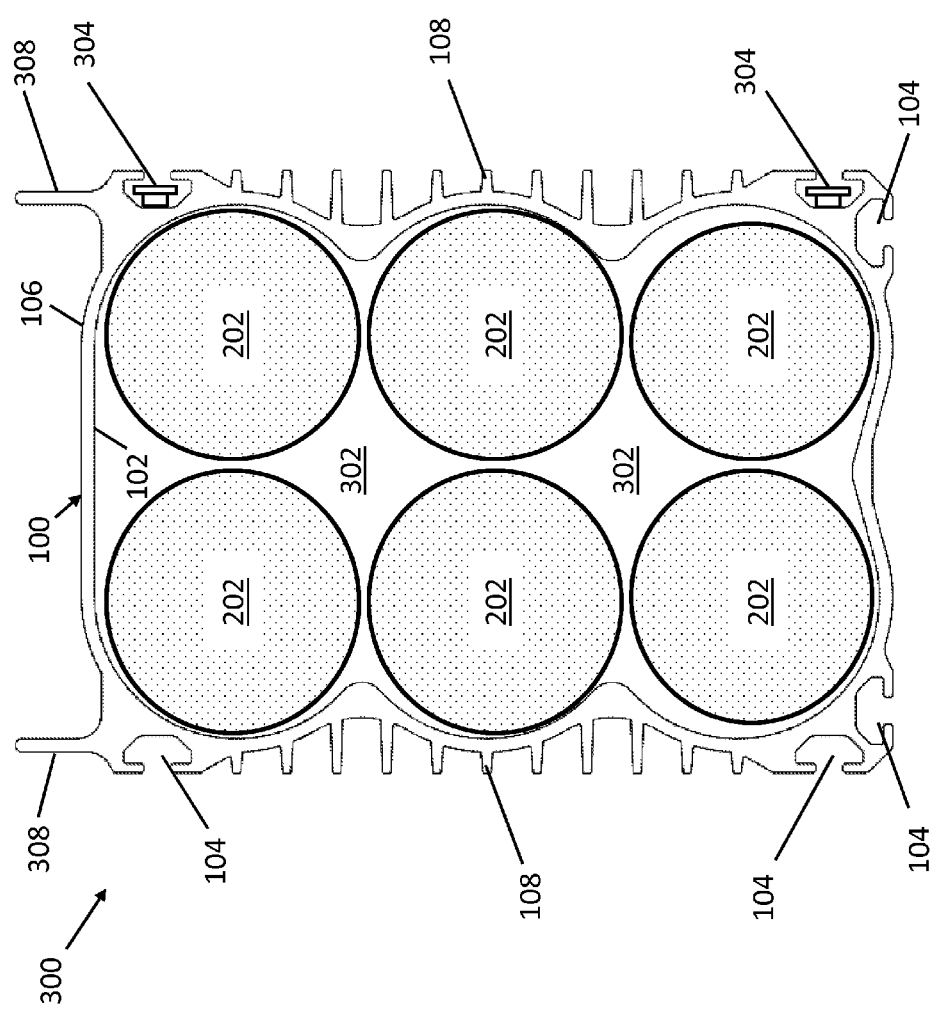
FIG. 3-5 show cross-sectional views of an apparatus according to embodiments of the present disclosure.

Turning to FIG. 3, an apparatus 300 according to embodiments of the present disclosure is shown. Apparatus 300 can include elongated sleeve 100 with contoured interior 102 enclosing plurality 200 (FIG. 2) of energy storage devices 202. In an example embodiment, as is shown in the lower-left and right of FIG. 3, contoured interior 102 can engage similarly curved exterior surfaces of energy storage devices 202. Energy storage devices 202 can be arranged in multiple rows, with each of the different rows being in thermal communication with contoured interior 102 of elongated sleeve 100. In this arrangement, each energy storage device 202 can transmit heat directly to elongated sleeve 100 without other energy storage devices 202 being positioned between a single energy storage device 202 and at least part of contoured interior 102. In an example embodiment, as is shown in FIGS. 2-5, a cross-section of apparatus 300 can include six energy storage devices 202 provided in three rows of two, i.e., a "two by three" arrangement. Alternatively, energy storage devices can include any number of rows/columns where the other row/column includes no more than two energy storage devices (e.g., two by two, two by four, two by eight, two by ten, two by fifty, two by one hundred, etc.), such that each energy storage device 202 can be in contact with elongated sleeve 100. For example, in a two by ten arrangement, each energy storage device 202 can directly contact elongated sleeve 100 and transfer heat thereto. Where excess temperature increase is not a significant risk during operation, other embodiments can include both rows and columns with more than three and/or odd numbers of energy storage devices therein. In addition or alternatively, energy storage devices 202 can be in a non-quadrilateral and/or complex geometry without conventional groups of rows and/or columns, such as a substantially linear, circular, pentagonal, heptagonal, parallelogram-shaped, trapezoidal, octagonal, or other type of arrangement where each energy storage device is not separated from elongated sleeve 100 by another energy storage device 202 in at least one direction. Although thermal inserts 210 are omitted from FIGS. 3-5 for the purposes of clarity and convenience, it is understood that thermal inserts 210 can contact the exterior surface of one or more energy storage devices 202 in apparatus 300, as is shown by example in FIG. 2.

A thermal transmitting mechanism 302 can be interposed between contoured interior 102 and energy storage devices 202. Thermal transmitting mechanism 302 may be electrically non-conductive, and as examples can include ceramic materials (e.g., potting materials), plastics, gaseous materials, and/or other thermally conductive materials with electrically insulative properties. As is discussed elsewhere herein, elongated sleeve 100 can include one or more slots 104 configured to include or receive a coupling component 304 therein, in addition to several thermally conductive fins 108 positioned on exterior surface 106. Slots 104 can be disposed within multiple locations and/or sides of exterior surface 108 of elongated sleeve 100. As is shown in FIG. 3, elongated sleeve 100 can include two slots 104 positioned in substantially perpendicular orientations relative to each other, such that each slot 104 can engage or interface with different types of components and/or components with differing orientations.

Coupling component 304 can include any mechanical component for mechanically coupling two components, such as a fastener, a matingly engagable slot for an inserted beam, a flange coupling, a disc coupling, a threaded coupling, a fluid coupling, a diaphragm coupling, a gear coupling, a joint, a bolting fixture, a mount, etc. In the example of FIG. 3, an embodiment of coupling component 304 is shown in the form of a bolting fixture. Coupling components 304 can be positioned within any and/or all slots 104 of elongated sleeve 100. Though two coupling components 304 are shown by example in FIG. 3, any desired number of coupling components 304 can be used, and in any desired number or combination of slots 104. In any case, coupling components 304 can be composed of a thermally conductive material, and can include the same material composition as elongated sleeve 100 or can be composed of a different material. In other embodiments, bolts or other mechanical instrument for coupling elements to coupling components 304 can extend through or be affixed to other elements, such as elongated sleeve 100, exterior fixtures and/or housings, rails (e.g., mounting rail(s) 314 discussed herein with respect to FIG. 5), and/or other components discussed herein or used generally in apparatus 300 or an energy storage device assembly.

Figure 4:
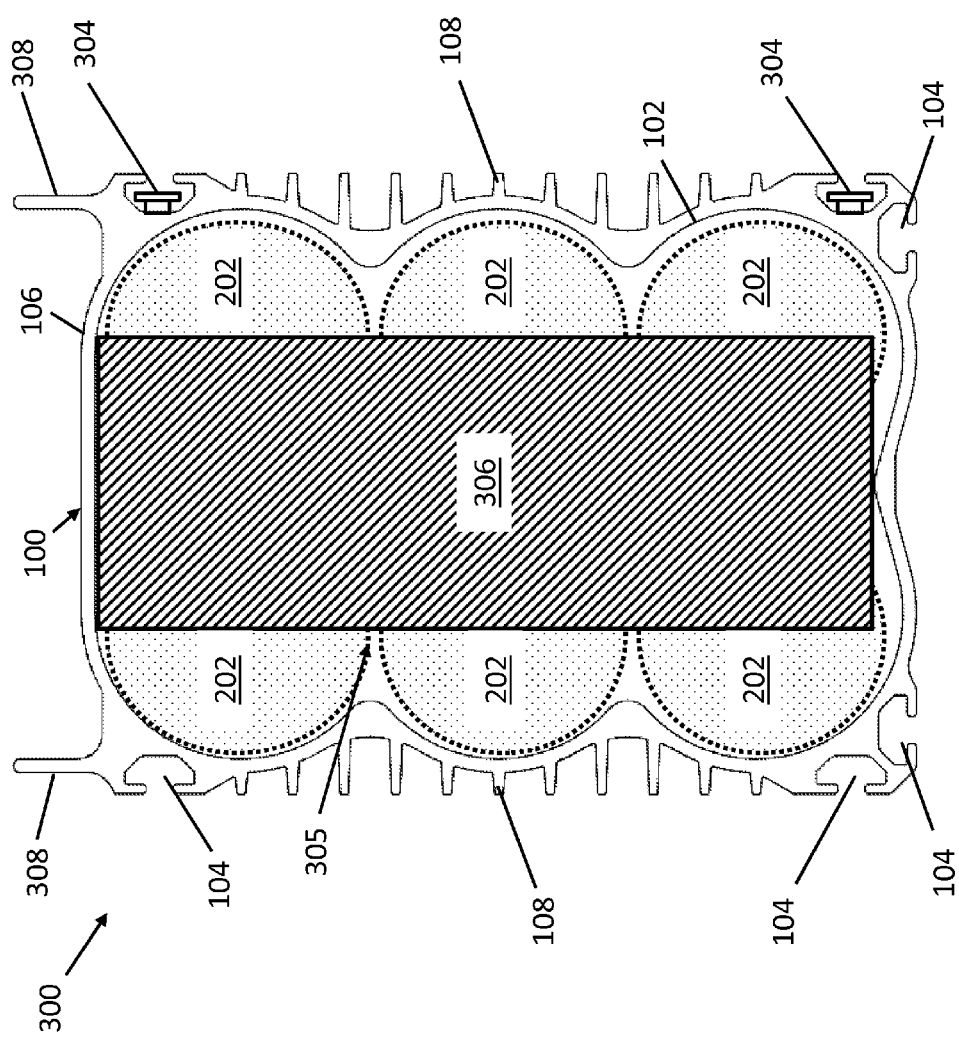
Figure 5:
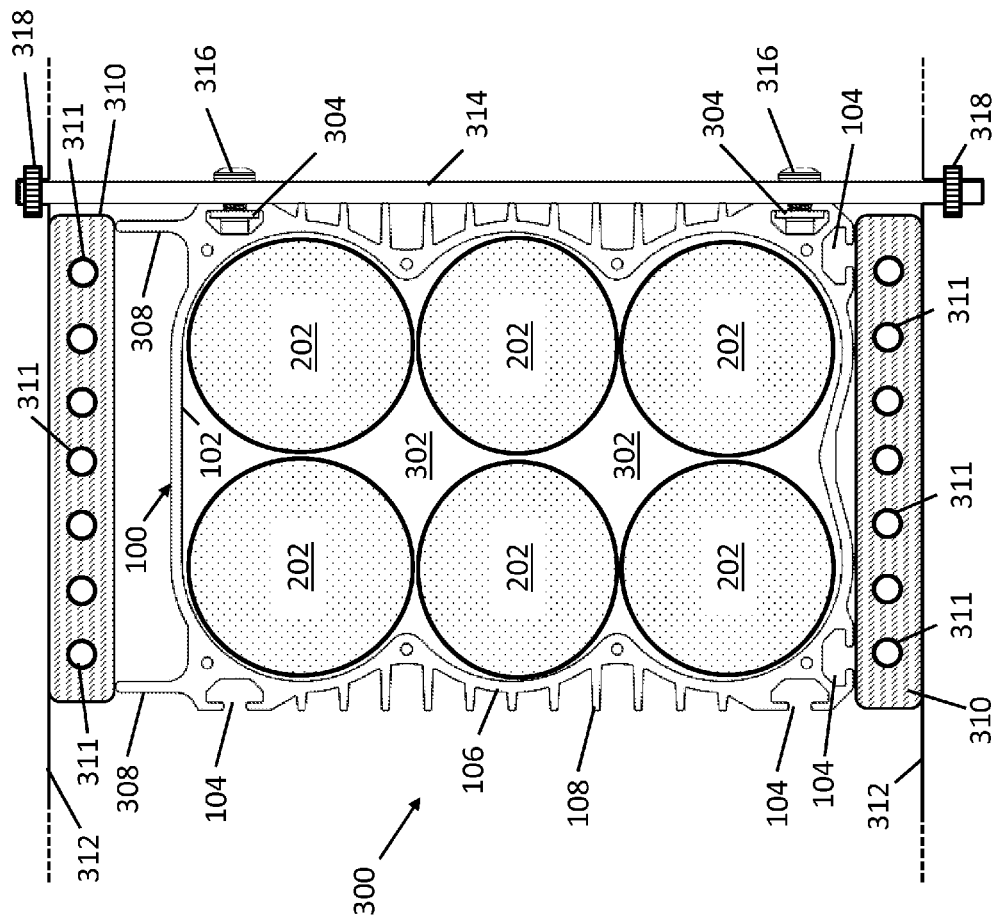

Although coupling components 304 are shown by example in FIGS. 3-5 as being distinct or structurally separated items mounted on or otherwise coupled to elongated sleeve 100 and/or slots 104, other embodiments are contemplated. For example, coupling component(s) 304 can be embodied as a specific portion or surface of elongated sleeve 100 and/or slots 104 for engaging other coupling components 304, one or more mounting rails, or other exterior components. In this alternative, coupling components 304 in the form of surfaces may be integral to elongated sleeve 100 and/or slots 104, and can be shaped, machined, modified, etc., to engage a variety of coupling components 304 and/or other structures. In this embodiment, coupling components 304 can provide a surface which allows for movement of other structures and elongated sleeve 100 relative to each other along one or more particular axes, e.g., to provide sliding engagement for horizontal and/or vertical motion of these components relative to each other. In an embodiment, coupling components 304 can provide for sliding engagement of elongated sleeve 100 with a mounting frame, housing, and/or other point of installation, such that elongated sleeve 100 can be slid into and out of the mounting frame for installation, removal, repair, maintenance, etc.

Referring to FIG. 4, another cross-sectional view of apparatus 300 is shown. Apparatus 300 can include a structural thermal bridge 305 positioned at, e.g., an axial end of a group of energy storage devices 202. Structural thermal bridge 305 can include one or more thermally conductive components for physically securing energy storage devices 202 within elongated sleeve 100 and for dissipating heat from within elongated sleeve 100 to exterior components (e.g., thermally conductive fins 108). In an example embodiment, structural thermal bridge 305 can include or be in the form of a thermal plate 306, which can be composed of a thermally conductive material such as a metal, a plastic, a ceramic material, etc. In other embodiments, structural thermal bridge 305 can include additional thermally conductive materials connected to thermal plate 306 to attach structural thermal bridge 305 to elongated sleeve 100. Thermal plate 306 can engage the axial ends of several energy storage devices 202 (i.e., be located adjacent to or in physical contact therewith, with or without intervening elements being positioned therebetween) and can be positioned adjacent to an axial terminus of elongated sleeve 100. In addition, structural thermal bridge 305 can be in thermal communication with thermal transmitting mechanism(s) 302 by any currently known or later developed form of structural coupling, such as forming a part of thermal transmitting mechanism 302, or contacting thermal transmitting mechanism 302. In another embodiment, structural thermal bridge can be proximal to thermal transmitting mechanism 302 with one or more thermally conductive elements positioned therebetween.

Turning to FIG. 5, another cross-sectional view of apparatus 300, with additional components included, is shown. In an embodiment, at least one thermally conductive fin 108 can be provided in the form of a structural fin 308. Structural fin 308 can be structurally distinguishable by, e.g., being larger than other thermally conductive fins 108 and/or extending in a particular direction. As is shown by example in FIGS. 3-5, structural fin 308 can be positioned on a particular surface (e.g., the top or bottom) of elongated sleeve 100. More specifically, structural fin 308 can extend in the same direction as an edge of slot(s) 104 (i.e., an interior edge of a T-slot), so that when other components contact structural fin(s) 308, the ends of structural fins 308 support the weight of elongated sleeve 100 at particular locations (e.g., centers of mass of elongated sleeve 100, coupling component(s) 304, and/or any components thereof or attached thereto). Structural fin 308 can provide structural support and/or separation from a shield 310 for elongated sleeve 100. Shield 310 can be positioned between structural fin 308 of elongated sleeve 100 and an external structure 312 outside elongated sleeve 100, and in an example embodiment can be positioned above and/or below energy storage devices 202. In addition or alternatively, a portion of exterior surface 106 can contact shield 310 directly without structural fin 308 being positioned therebetween. External structure 312 can take the form of an external component of a larger energy storage device assembly such as, without limitation, one or more structures such as: housings (e.g., ultracapacitor housings), substantially flat or rounded plates, heat sinks, shock absorbers, electrical cages, conductive or non-conductive casings, walls, floors, ceilings, other elongated sleeves 100, other assemblies for structurally connecting elongated sleeve 100 to a larger frame, etc.

Shield 310 can be composed of one or more thermally conductive materials discussed elsewhere herein, and may have the same material composition as elongated sleeve 100 or a different material composition. Shield 310 may include other heat transfer materials and/or properties therein where desired. For example, shield 310 can include channels 311 therein for transmitting a refrigerant (e.g., cooling air or water) to absorb heat dissipated from elongated sleeve 100 through structural fin 308. Shield 310 is shown by example in FIG. 5 as contacting two opposing sides of elongated sleeve 100, and it is understood that other arrangements are possible according to embodiments of the present disclosure. For instance, where desired, shield 310 can be disposed circumferentially about exterior surface 106, thermally conductive fins 108, and/or structural fins 308 of elongated sleeve 100. In other embodiments, shield 310 may enclose or contact only part of exterior surface 106, thermally conductive fins 108, and/or structural fins 308. In yet another embodiment, shield 310 may enclose structural fin(s) 308 or thermally conductive fin(s) 108 without contacting elongated sleeve 100 itself. In other embodiments, as is shown in FIG. 5, shield 310 can contact structural fin(s) 308 on top of elongated sleeve 100 while directly contacting a bottom surface of elongated sleeve 100. Relative to the structure of a larger assembly, shield 310 can be a casing, a housing, a structural support, an interchangeable sleeve, an addition for particular applications, and/or other items adapted for enclosing elongated sleeve 100 therein.

Continuing to refer to FIG. 5, a mounting rail 314 can be mechanically coupled to coupling component 304. Mounting rail 314 in turn can mechanically couple elongated sleeve 100 to external structure 312. Where coupling component 304 is in the form of a bolting fixture, mounting rail 314 can be mechanically coupled thereto by way of a bolt 316. Here, bolt 316 can extend through a bolt hole (not shown) within mounting rail 314 to contact coupling component 304 to be coupled (i.e., connected, affixed, or otherwise secured) thereto. The mechanical connection between mounting rail 314 and external structure 312 can be provided via a fastener 318 such as a bolt, screw, adhesive connection, and/or other type of instrument for mechanically connecting mounting rail 314 to a particular structure, such as a housing, point of installation, other energy storage device assembly, etc. Mounting rail 304 can be composed of any currently known or later developed thermally-conductive material, and as examples can be composed of a metal, a ceramic material, an organic material, and/or other types of currently known or later developed materials capable of transmitting heat. When coupled to external structure 312 and elongated sleeve 100, mounting rail 314 can conduct heat from energy storage devices 202 external structure 312 to dissipate heat from energy storage devices 202.

Embodiments of the present disclosure can provide several technical and commercial advantages, some of which are discussed herein by way of example. Manufacturing and/or modifying a housing to include several slots and/or couplings to external components such as mounting rails can enhance the dissipation of heat from multiple energy storage devices while providing a structural connection to external housings, components, other assemblies of energy storage devices, cooling systems, and the like. Additionally, embodiments of the present disclosure can provide an increased number of thermal dissipating structures, such as thermal fins, in comparison to conventional housing. Embodiments of the present disclosure can also reduce the effect of vibrations or other external forces on an assembly of energy storage devices.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
an elongated sleeve having a contoured interior configured to enclose each of a plurality of energy storage devices, wherein the elongated sleeve is composed at least partially of a thermally conductive material; and
at least one slot disposed on an exterior surface of the elongated sleeve, and extending substantially in parallel with an axial length of the elongated sleeve, wherein the at least one slot extends continuously between opposite axial ends of the elongated sleeve, and wherein the at least one slot is configured to receive a coupling component for mechanically coupling a mounting rail to the elongated sleeve.

2. The apparatus of claim 1, further comprising a structural thermal bridge including at least one thermal plate engaging an end of a pair of adjacent energy storage devices to physically secure the plurality of energy storage devices and thermally communicate heat therefrom.

3. The apparatus of claim 1, wherein the at least one slot is shaped to retain a plurality of coupling components therein for mechanically coupling the elongated sleeve to a plurality of mounting rails.

4. The apparatus of claim 1, wherein the at least one slot is shaped to retain an end of the coupling component therein, and wherein the at least one slot further includes a passage connecting the at least one slot to the exterior surface of the elongated sleeve, wherein the passage is shaped for a portion of the coupling component to pass therethrough.

5. The apparatus of claim 1, further comprising a plurality of thermally conductive fins extending from the exterior surface of the elongated sleeve, wherein at least one of the plurality of thermally conductive fins extends substantially in parallel with the at least one slot and the axial length of the elongated sleeve.

6. The apparatus of claim 5, further comprising a thermally conductive shield for the elongated sleeve positioned between at least one of the plurality of thermally conductive fins and an external structure positioned outside the elongated sleeve.

7. The apparatus of claim 1, wherein the at least one slot includes a pair of slots disposed on opposing exterior surfaces of the elongated sleeve.

8. The apparatus of claim 1, wherein the coupling component is composed of a thermally conductive material.

9. The apparatus of claim 1, further comprising a thermal transmitting mechanism interposed between the elongated sleeve and the plurality of energy storage devices.

10. The apparatus of claim 1, wherein the plurality of energy storage devices are arranged in a plurality of rows, each of the plurality of rows being in thermal communication with the contoured interior of the elongated sleeve.

11. An apparatus comprising:
an elongated sleeve having a contoured interior configured to enclose and engage a curved surface of each of a plurality of energy storage devices, wherein the elongated sleeve is composed at least partially of a thermally conductive material;
at least one slot disposed on an exterior surface of the elongated sleeve; and
a coupling component disposed within the at least one slot, the coupling component receiving a mounting rail therein, wherein the mounting rail and the coupling component conduct heat from the plurality of energy storage devices and mechanically couple an external structure to the elongated sleeve.

12. The apparatus of claim 11, further comprising a structural thermal bridge including at least one thermal plate engaging an end of a group of adjacent energy storage devices to physically secure the plurality of energy storage devices and thermally communicate heat therefrom.

13. The apparatus of claim 11, wherein the at least one slot comprises a substantially T-shaped slot.

14. The apparatus of claim 13, further comprising an additional slot disposed on the exterior surface of the elongated sleeve, the additional slot having a substantially perpendicular orientation relative to the at least one slot.

15. The apparatus of claim 11, further comprising a plurality of thermally conductive fins extending from the exterior surface of the elongated sleeve and contacting the external structure.

16. The apparatus of claim 11, wherein the coupling component comprises a bolting fixture.

17. The apparatus of claim 11, wherein the at least one slot includes a pair of slots disposed on opposing exterior surfaces of the elongated sleeve.

18. The apparatus of claim 11, wherein the coupling component is composed of a thermally conductive material.

19. The apparatus of claim 11, further comprising a thermal transmitting mechanism interposed between the elongated sleeve and the plurality of energy storage devices.

20. An apparatus comprising:
a plurality of axially aligned energy storage devices each having a curved exterior surface, immediately adjacent energy storage devices being connected together at a welded joint;
an elongated sleeve having a length and a contoured interior, the contoured interior enclosing the plurality of energy storage devices and engaging the curved exterior surfaces of the plurality of energy storage devices, wherein the elongated sleeve is composed at least partially of a thermally conductive material;
at least one slot disposed on an exterior surface of the elongated sleeve;
a coupling component disposed within the at least one slot; and
a mounting rail mechanically coupled to the coupling component, wherein the mounting rail conducts heat from the plurality of energy storage devices to an external structure mechanically coupled to the elongated sleeve through the mounting rail.

\* \* \* \* \*